US005770859A

United States Patent [19]

Bielawski

[11] Patent Number: 5,770,859

[45] Date of Patent: Jun. 23, 1998

[54] TIME OF FLIGHT MASS SPECTROMETER HAVING MICROCHANNEL PLATE AND MODIFIED DYNODE FOR IMPROVED SENSITIVITY

[75] Inventor: Jacek Bielawski, Saltsjoebaden, Sweden

[73] Assignee: The Perkin-Elmer Corporation, Foster City, Calif.

[21] Appl. No.: 280,261

[22] Filed: Jul. 25, 1994

[51] Int. Cl.[6] ............................ B01D 59/44; H01J 49/00

[52] U.S. Cl. ............................................................ 250/287

[58] Field of Search .................................... 250/281, 287, 250/423 P

[56] References Cited

U.S. PATENT DOCUMENTS

| | | | |
|---|---|---|---|
| 4,490,610 | 12/1984 | Ulbricht | 250/287 |
| 4,625,112 | 11/1986 | Yoshida | 250/287 |
| 4,808,818 | 2/1989 | Jung | 250/282 |
| 4,835,383 | 5/1989 | Mahoney et al | 250/282 |
| 5,160,840 | 11/1992 | Vestal | 250/287 |
| 5,202,561 | 4/1993 | Giessmann et al. | 250/281 |
| 5,376,788 | 12/1994 | Standing et al. | 250/287 |

*Primary Examiner*—Bruce Anderson

*Attorney, Agent, or Firm*—Joseph H. Smith; John A. Frazzini

[57] ABSTRACT

A time of flight spectrometer having a dynode detector in which a set of dynode plates at an output end of the dynode is each connected to an associated capacitor that functions as a charge reservoir for said dynode, thereby substantially avoiding saturating this dynode. A grid is place adjacent to and parallel to a front surface of a target to produce an acceleration region that accelerates ions substantially perpendicularly away from said front surface, thereby reducing time of flight deviations caused by nonperpendicular emission of ions from the target. A biased guide wire aligned perpendicular to the front surface of the target produces an electric field that images ions from the target onto a detector.

9 Claims, 7 Drawing Sheets

TIME OF FLIGHT MASS SPECTROMETER HAVING MICROCHANNEL PLATE AND MODIFIED DYNODE FOR IMPROVED SENSITIVITY

TECHNICAL FIELD

This invention relates in general to time of flight mass spectrometers and relates more particularly to a detector that is specially adapted to improve sensitivity.

Convention Regarding Reference Numerals

In the figures, the first digit of a reference numeral indicates the first figure in which is presented the element indicated by that reference numeral.

BACKGROUND OF THE INVENTION

In a typical laser desorption, time of flight mass spectrometer 10 illustrated in FIG. 1, a sample is deposited onto a target 11 and then a short pulse of spatially localized energy is directed onto the sample to eject from the sample a spatially and temporally localized region of ions. The target typically includes a rigid support member that is coated with a support matrix on which the sample is deposited. The ejected ions typically include both matrix and sample ions. This energy pulse can be applied by a laser 12 of wavelength selected to desorb and ionize the sample and/or the support matrix on which the sample is deposited.

These ejected ions are accelerated by an electric potential and are usually allowed to drift through at least one field-free region 13 before they reach a detector, such as a dynode 14, that detects the reception of these ions. Within these field-free regions, the ion trajectories within this beam are substantially parallel, so that the beam does not become unduly large when it reaches the next element within this spectrometer.

The electric field accelerates each ion to a velocity proportional to the square root of the ratio of the ion charge to the ion mass, so that the time of arrival at the detector is inversely proportional to the square root of the mass of each ion. A timer 15 is started at the time of the energy pulse to measure the time of flight of the various ions in this beam from the target to the detector. The mass of each detected ion is identified by its time of flight from the target to the detector. A mass spectrum of the sample is generated from the intensity of the detected ions as a function of time. Logic circuitry 16 is responsive to user input and to detector 14 and also controls the timer and laser 12. A time of flight mass spectrometer provides the following advantages: a complete mass spectrum is produced by each pulse; many mass spectra can be produced per second; and there is no limit on the range of masses that can be detected.

Ideally, the velocities of the ejected ions are all parallel and all ions of a given type have identical velocities. Because this is not the case, ion optical elements are typically included to image the ejected electrons and to compensate at least partially for velocity variations that depend on factors other than the charge-to-mass ratio of the ions. Such variations degrade the resolution of this mass detector.

One such ion optical element is an ion reflector 17 in which the electric fields within the reflector are selected to correct some of the astigmatism of this ion optics system. For ions of equal charge-to-mass ratio, those ions with a larger initial positive longitudinal component arrive at the detector earlier than ions with zero initial longitudinal component (i.e., the component perpendicular to the front surface of the target). At the ion reflector, the higher energy ions penetrate farther into the reflector, thereby spending a greater time in the reflector than those with zero initial longitudinal component. The reflector parameters are selected so that the differential times spent in the ion reflector compensate for the time of flight differences resulting from the initial longitudinal velocity component differences of the ions.

In some of these reflectors, the electric fields are produced by one or more grids that produce the electric fields used to reflect the ions. The potentials on the grids are selected to compensate for the variations in the initial longitudinal components of the ions. Unfortunately, such grids produce variations in the reflecting fields and these variations produce dispersion in the time of flight of the ions.

It is therefore preferred to utilize gridless reflectors 15, such as that presented in U.S. Pat. No. 4,625,112 entitled *Time Of Flight Mass Spectrometer* issued to Yoshikaza Yoshida on Nov. 25, 1986. In that patent, the voltages of a plurality of reflector electrodes 18 vary as a quadratic function of the distance of each plate along the axis of this reflector. Each reflector electrode is an annular ring oriented perpendicular to a central axis of the ion beam. The parameters of this quadratic variation in the electrode voltages are selected to compensate for the variations in the initial longitudinal components of the ions.

A common ion detector utilized in these time of flight mass spectrometers is a dynode 14, illustrated in greater detail in FIG. 2. The incident ion beam 13 passes through a grounded entrance grid 20 that terminates strong electric fields within the dynode that would otherwise extend into the path of the incident ion beam, thereby degrading resolution. To enable a bias of −2,850 volts to be applied to a conductive top surface 21 of a microchannel plate 22, a few millimeter thick insulating ring 23 is sandwiched between the grounded entrance grid 20 and a microchannel plate contact ring 24 that is biased at −2,850 volts and that is in contact with top surface 21 of the microchannel plate. A bottom surface 25 of the microchannel plate is in contact with a conductive ring 26 of 25 mm diameter and 18 mm thickness that terminates electrical fields from bottom surface 25. This ring functions as a lens that focusses electrons emitted from the microchannels at bottom surface 25 onto a first dynode plate 27A of a dynode assembly 27.

The microchannel plate converts each incident ion into a pulse of electrons. A bias voltage, on the order of 45–1,000 volts, across the microchannel plate results in the production of approximately 500–50,000 electrons for every ion incident on the microchannel plate. Thus, the microchannel plate is utilized both as an ion-to-electron beam converter and as an amplifier that produces a five orders of magnitude amplification of the incident signal.

Dynode 27, such as the EM226 from THORN EMI Electron Tubes, Inc., 23 Madison Road, Fairfield, N.J. 07006 USA, includes 16 dynode plates 27A, 27B . . . , 27P that each amplify the electron beam signal incident thereon. For a voltage drop of 2000 volts between dynode plate 27A and 27P, this dynode produces an amplification of at least one million. Unfortunately, this system saturates under these conditions at an output signal that is smaller than desired. This produces the following limitations on the performance of this detector. First, even at maximum output signal, this output signal is smaller than desired and therefore will exhibit a lower than desired signal-to-noise ratio. Second, spectral resolution is degraded either by the saturation effects when operated at the upper limit or by loss of resolution if operated at lower amplification. Third, the current-limited operation at or near maximum output introduces a temporal spread in time-dependent output signals. However, because a time of flight mass spectrometer produces a mass spectrum in which the different masses show up at different times, this loss of temporal resolution reduces the mass resolution of this time of flight mass spectrometer. Therefore, it would be desirable to improve the peak output signal and the resolution of this mass spectrometer.

SUMMARY OF INVENTION

In a conventional dynode, a resistor ladder having equal resistances between each rung of the ladder is utilized to bias the amplification dynode plates of the dynode. Experimental investigation of the signals at the various dynode plates 27A–27P of this dynode have shown that, under the operating conditions discussed above, the last four stages of the dynode are saturated. Although the voltage drop across the dynode plates could be decreased and/or the gain of the microchannel plate could be reduced to avoid this saturation, this would produce an unacceptably small output amplitude.

In accordance with the illustrated preferred embodiment, a set of Q dynode plates at an output end of the dynode are each connected to an associated capacitor that functions as a reservoir of charge that can be transferred quickly to these Q dynode plates to prevent degradation of the gain per stage and to maintain signal ramping speed. In the particular use of such a modified dynode in a time of flight mass spectrometer, this structure produces a greatly increased range of amplification without degrading the resolution of mass spectra produced by this spectrometer.

These capacitors are preferably located outside of the vacuum environments within the mass spectrometer drift region and within the dynode detector, so that inexpensive electrolytic capacitors can be utilized to provide the amount of charge storage needed to avoid degrading resolution. If these capacitors were included in either of these low vacuum environments, expensive ceramic capacitors would be required. In one class of embodiments, a first M dynode plates in the dynode are biased by means of a resistive ladder located within the low-pressure dynode enclosure surrounding the dynode plates.

A guide wire is included in the drift region to image the pulse of ions onto the detector. This guide wire is substantially perpendicular to the target and extends outward from a point adjacent to the point of incidence on the target of the pulse of energy that produces the pulse of ions. The voltage of the guide wire is selected to image the pulse of ions onto the detector. Preferably, the pulse of ions is produced by a pulse of light from a laser beam directed onto the target at an angle less than 46° with respect to the normal to the target at the point of incidence of this laser beam.

BRIEF DESCRIPTION OF DRAWINGS

FIGS. 4A–4C are connected.

Figure 4A:
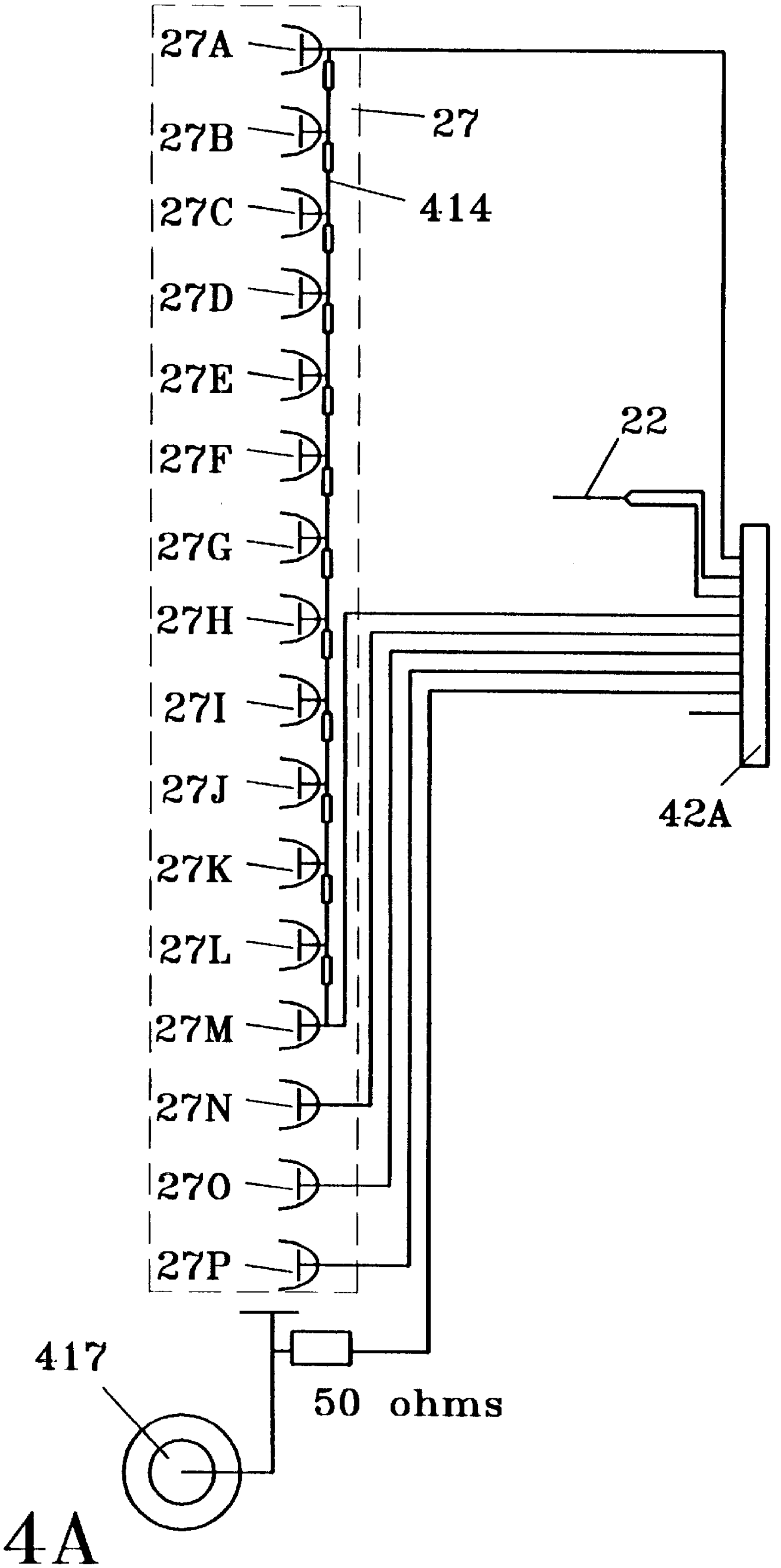
FIGS. 4A–4C illustrate the electronic circuitry that provides sufficient power and current to all of the plates of a dynode used in a time of flight mass spectrometer.
Figure 4B:
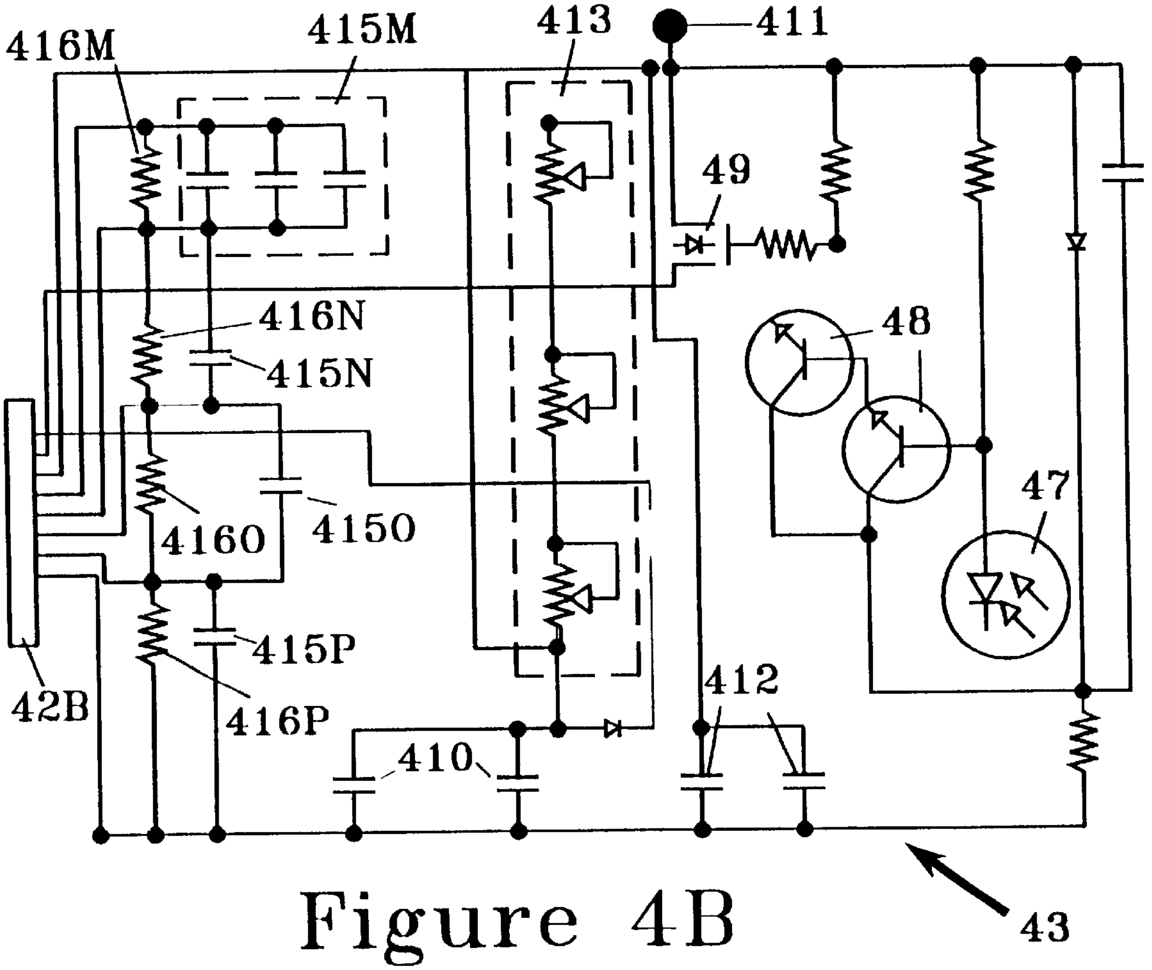
Figure 4D:
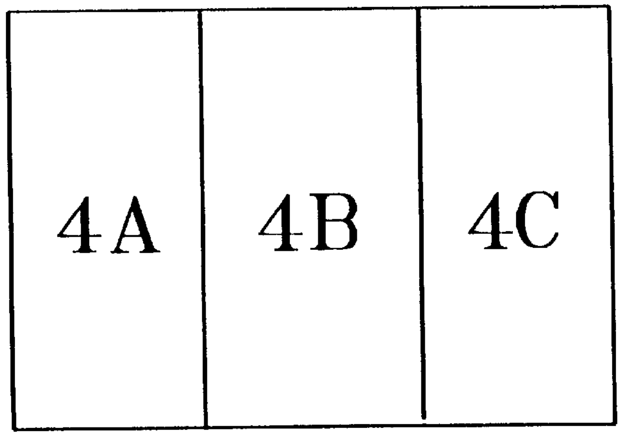
FIG. 4D illustrates how
Figure 4C:
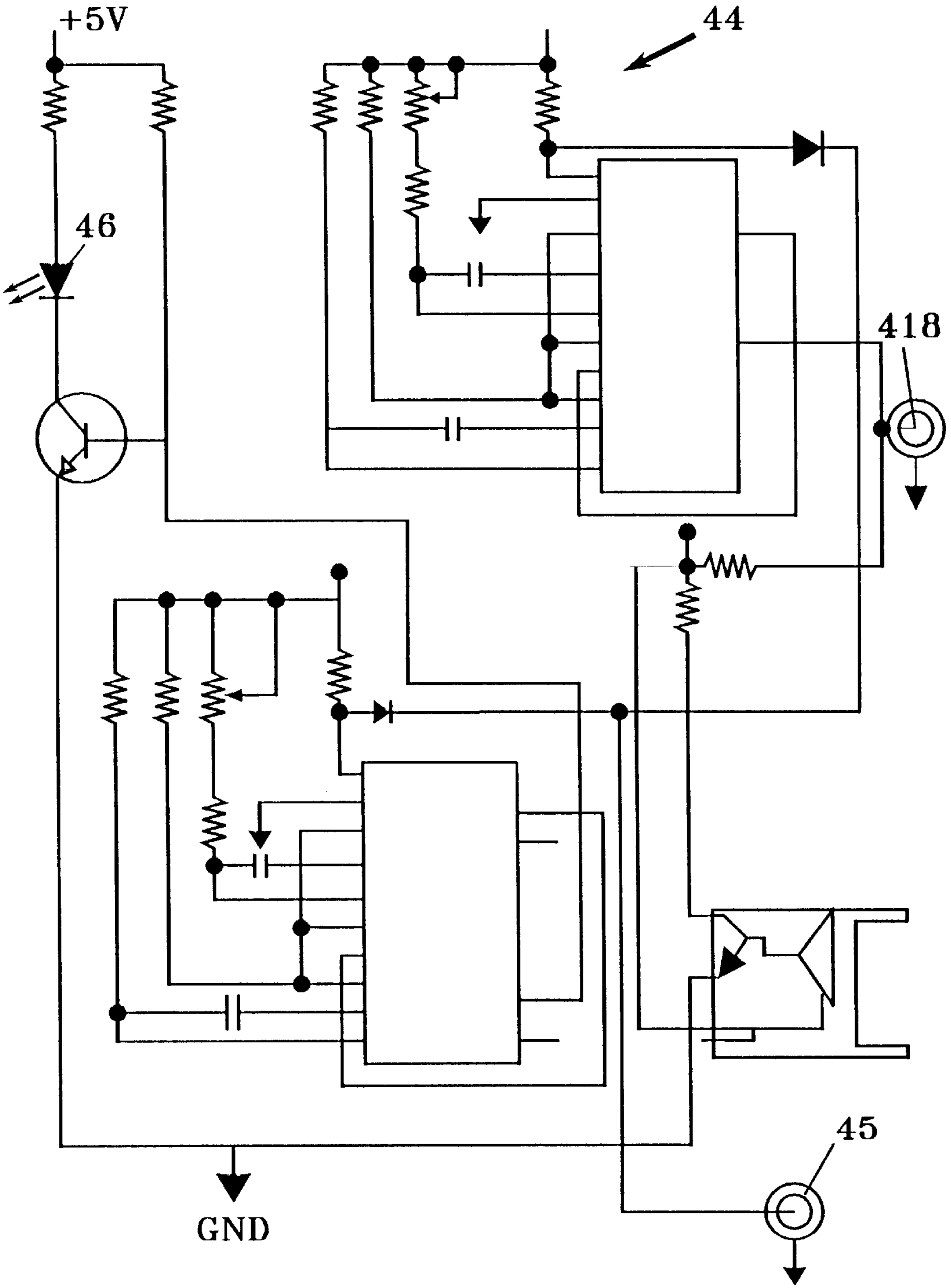

Appendix A is a table of the values of the components in FIGS. 4A–4C.

MODE FOR CARRYING OUT THE INVENTION

Figure 1:
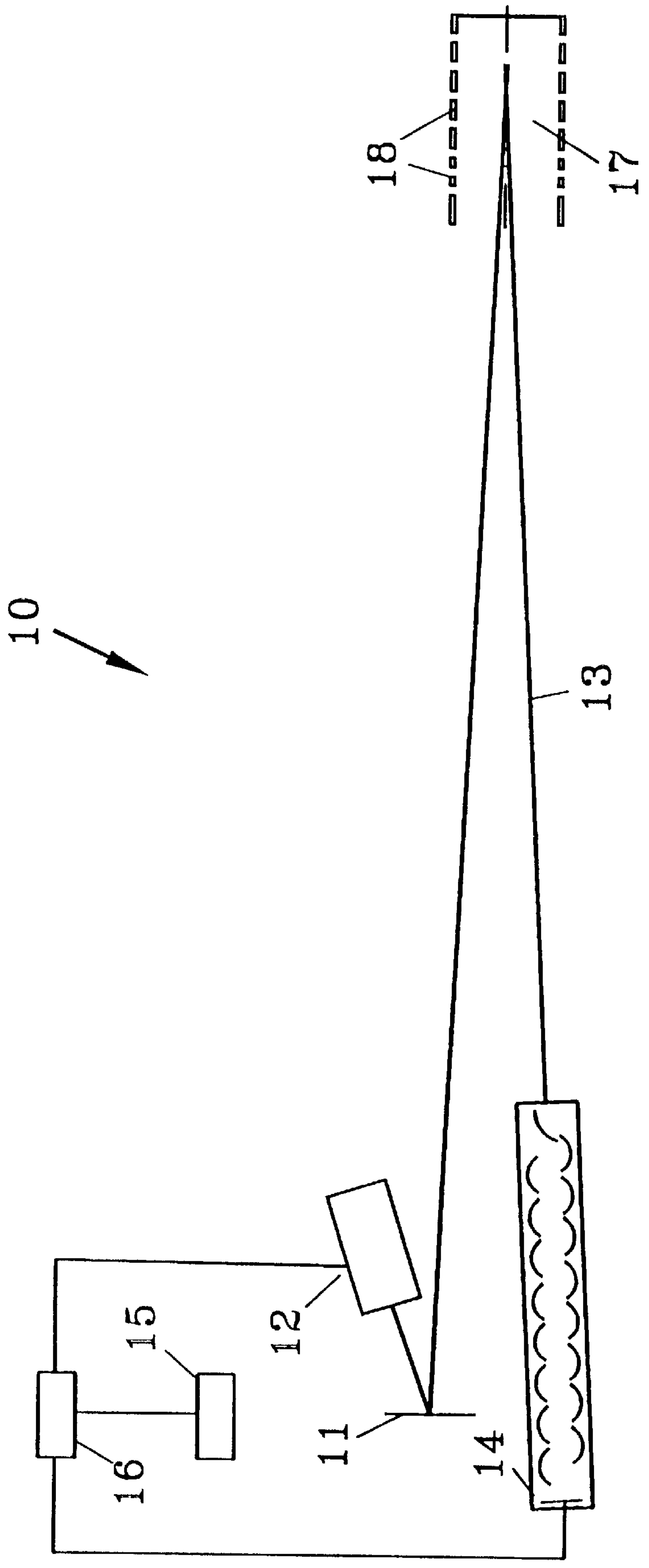
FIG. 1 illustrates the structure of a typical mass spectrometer.
Figure 2:
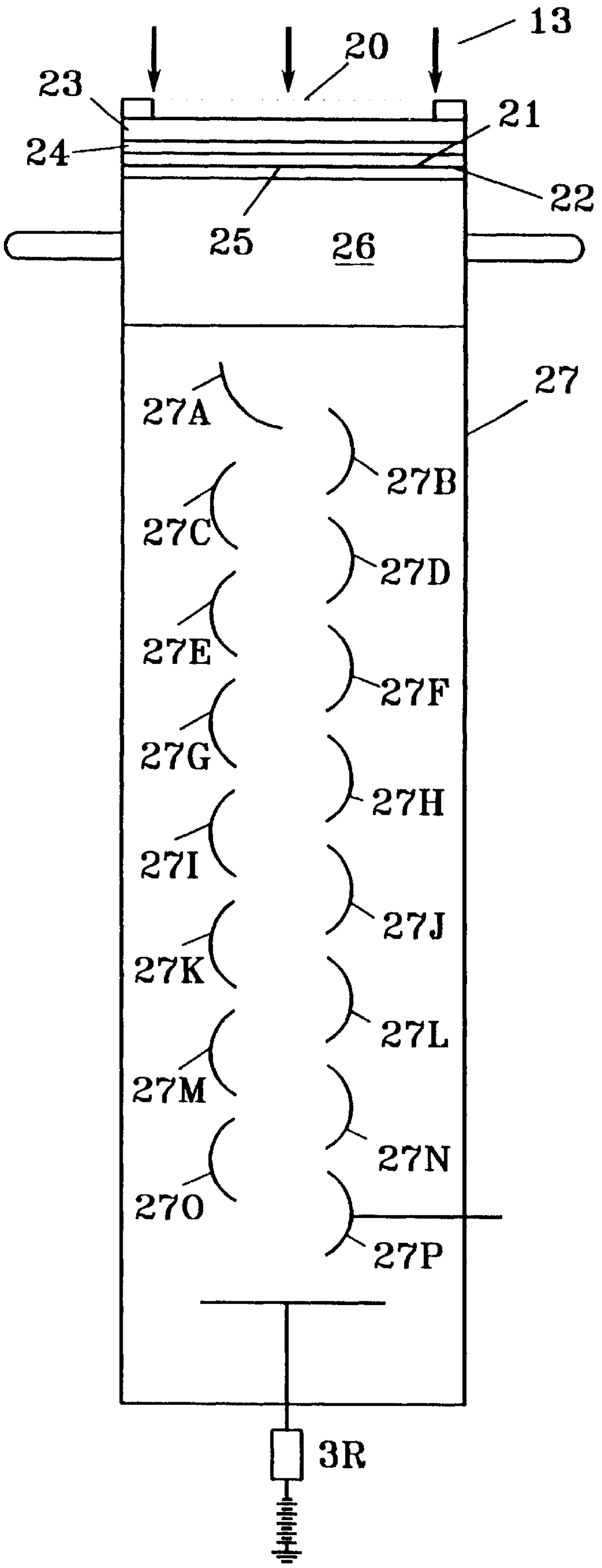
FIG. 2 illustrates a common dynode structure utilized in an ion detector section of a time of flight mass spectrometer.
Figure 3:
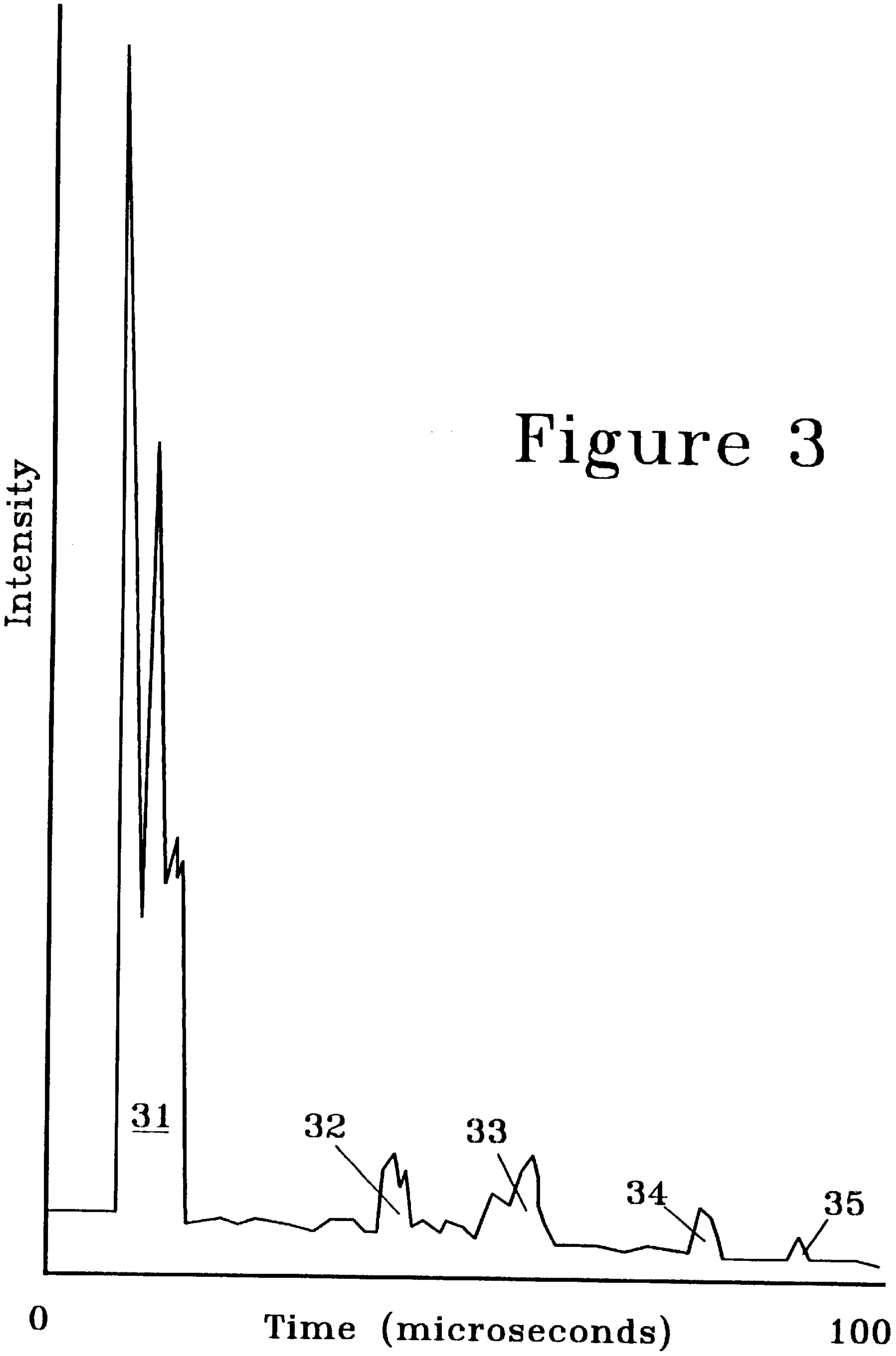
FIG. 3 is a typical mass spectrum produced in a time of flight mass spectrometer.

FIG. 3 illustrates a typical mass spectrum produced in a time of flight mass spectrometer. In time of flight mass spectrometry, it is common to deposit a sample of interest onto a target that is covered by a support matrix of a material that is often much lighter than the materials being analyzed. For example, because time of flight mass spectrometers are particularly useful in analyzing large mass molecules, such as many biological compounds, the molecules of the support matrix are typically much smaller and lighter than the molecules being analyzed.

The material of interest is typically vaporized by a laser pulse that also typically vaporizes at least some of the support matrix. The amount of support matrix that is vaporized can be relatively large and is typically concentrated within a relatively narrow mass range 31. The intensity of the spectral peaks produced by such matrix particles can be many times as large as the peaks 32–35 for the sample molecules of interest. Because such large peaks can saturate the detector long enough to interfere with the detection of later-arriving sample particles, it is advantageous to activate the detector only at a time subsequent to the arrival of the matrix particles, but prior to the arrival of the sample molecules. Typically, activation of the detector after a delay on the order of 5–40 microseconds from the time of the laser pulse will avoid detecting the support matrix particles and will avoid degrading detection of the sample molecules.

FIGS. 4A–4C illustrate the electronic circuitry that provides sufficient power and current to all of the dynode plates of a dynode 27 that it is suitable for use in time of flight mass spectrometry. FIGS. 4A–4C also illustrate the circuitry that delays activation of the detection circuitry until after the support matrix peak has passed. FIG. 4D is a table of the values of the components in FIGS. 4A–4C.

A microchannel plate 22 and the dynode plates 27A–27P of a dynode 27 are included in a detector module 41 of a time of flight mass spectrometer. Detector module 41 is connected through an electrical connector 42A/42B to a gating/bias module 43 (shown in FIG. 4B) that provides the voltages and currents required by the detector module. This module provides the voltages and current levels required to power the dynode 27 and the microchannel plate 22 in the detector module. A trigger and delay module 44 (shown in FIG. 4C) is responsive to an input signal, received at a first microwave BNC input connector 45, that indicates the occurrence of a laser burst that produces ions from a sample target. In response to this input signal, after a delay sufficient to avoid detecting the pulse of matrix ions within mass range 31, a light emitting diode (LED) 46 produces an optical pulse that is received by a photosensitive pin diode 47 in gating/bias module 43. The delay can be varied over a range from 0 to 100 microseconds. In response to reception of this optical pulse, transistors 48 turn on a high voltage switch 49 that switches on the voltage to the top surface 21 of the microchannel plate, thereby accelerating incident ions into the microchannel plate with sufficient energy that they produce an amplifying cascade of electrons within the channels of this plate. Thus, switch 49 functions as an on-off switch for the microchannel plate.

A pair of capacitors, having a combined capacitance of 9.4 nF, function as a charge reservoir 410 that maintains a substantially constant voltage on the top surface 21 of microchannel plate 22. A power supply (not shown) applies a voltage of −3,000 volts to a power input 411. It is because of this large voltage that LED 46 and pin diode 47 are utilized to connect modules 43 and 44 in a manner that isolates this large voltage from the components in module 44, thereby protecting the inputs and outputs in that module. This power supply charges up a pair of capacitors 412 of combined capacitance 9.4 nF to stabilize the 2,850 volt voltage drop across the gating/bias module. A resistance 413 of 1 MΩ sets the bias voltage. Resistance 413 and charge reservoir 410 maintain the voltage across the microchannel plate 22 to a voltage in the range 450–1000 volts.

The bias on each of dynodes 27A–27L is set by a resistance ladder 414 in which each resistor has a resistance of 100 kiloOhms. The voltage drop across that ladder is on the order of 2 kV. Because of the geometric increase of the current needed for each successive dynode plate 27A–27P, the current demands at plates 27M–27P exceed the amount that can be provided only via this resistance ladder. Therefore, each of dynode plates 27M–27P is connected to an associated capacitor 415M–415P, of respective capacitances 15.4 nF, 4.7 μF, 10 μF and 10 μF. These capacitors are charged by a resistance ladder 416M–416P of resistances 200 kΩ, 300 kΩ, 400 kΩ and 300 kΩ, respectively. These resistances and capacitances are selected to substantially avoid saturating any of dynodes 27M–27P. The values of the capacitances are selected to store enough charge to achieve the above-indicated maximum fractional discharge of any of these dynode plates during operation. Because the discharge interval for these capacitors is typically much smaller than their charging interval, the resistance values of resistors 416M–416P are selected to achieve this rate of recharging of these capacitors as well as to achieve the nominal voltages for each of these capacitors as part of the resistance ladder. A second BNC connector 417 supplies the detector signal and a third BNC connector 418 provides the trigger signal for the laser.

The use of capacitive buffering of the voltage on the last few dynode plates 27M–27P provides enough increase in gain that the laser intensity can be decreased sufficiently to significantly linearize the output of this detector, without degrading sensitivity, as compared to existing devices. Nonlinear effects arise not only within dynode 27, they also arise within the pulse of charge released from the target by, the laser pulse. In particular, the bundle of ions released from the target by the laser pulse all repel one another, thereby introducing variations in the longitudinal and transverse components of these charges. Such variations produce spectral broadening of the peaks within the resulting mass spectrum. Therefore, spectral peaks can be narrowed by reducing the intensity of the laser pulse.

Figure 5:
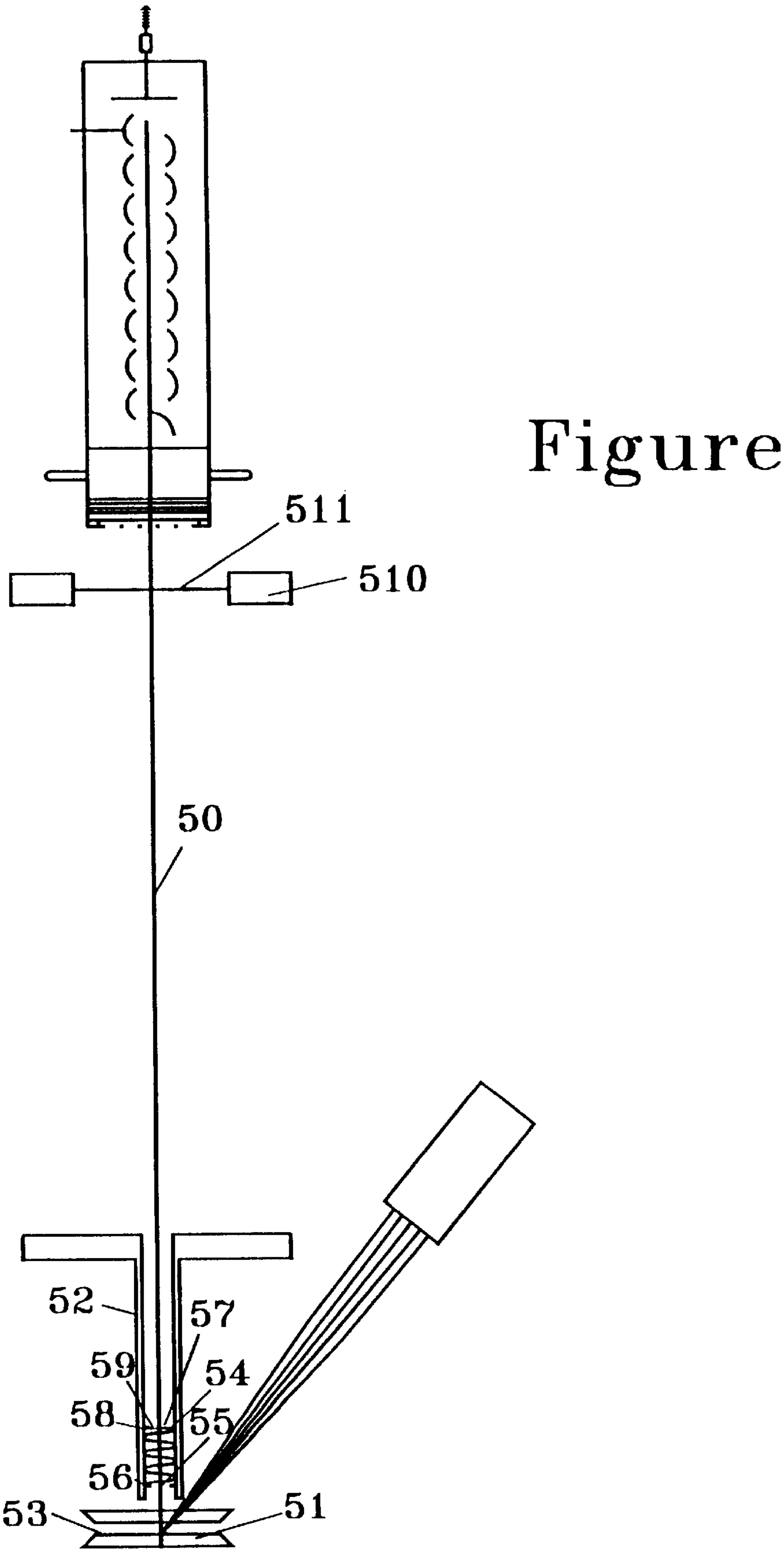
FIG. 5 illustrates a guide wire that increases the sensitivity of the time of flight mass spectrometer.

The width of spectral peaks can be further reduced by use of a guide wire 50 illustrated in FIG. 5. This guide wire extends parallel to and substantially coaxial with an axis perpendicular to and centered on a target 51. A cylinder 52 of 25 mm diameter, having its axis substantially perpendicular to a front surface 53 of the target, extends outward from the target a distance of about 600 mm. A coil spring 54 has a first end 55 supported against a lip 56 of cylinder 52 and has a second end 57 in contact with a ring 58. A first support wire 59 extends between diametrically opposite points of ring 58 and a second support wire 510 extends between diametrically opposite points of a ring 511. Opposite ends of the guide wire are attached to points of support wires 59 and 510 that lie on the axis of cylinder 52. Wire 50 is preferably 0.05 mm diameter copper wire, but this choice of gauge is not critical. The voltage on the wire is selected such that the pulse of ions ejected from the target are imaged onto a detector located adjacent to an end of the guide wire distal from the target.

The distance of the ions from the guide wire varies approximately sinusoidally as a function of distance along the guide wire. The voltage and length of the guide wire are selected to image the emitted ions onto the detector. This can be achieved by any integral multiple of a half sine wave, but preferably is achieved for a half sine wave. An advantage of achieving this by a single half sine wave is that the voltage of the wire is minimized and associated dispersion is minimized. An advantage of achieving this by some multiple greater than one of a half sine wave is that the emitted ions are more tightly contained near the guide wire, enabling the drift region to have a reduced diameter. For a guide wire of length 60 cm, the voltage of the guide wire is typically between 5 volts and a few hundred volts. In conventional time of flight mass spectrometers, the length of the drift region is on the order of 2–4 meters, instead of 0.6 meters as in this embodiment. This reduced length significantly reduces the space-charge-induced component of dispersion in the resulting spectra.

The dispersion of the time of flight of the ions in the beam is approximately proportional to the ratio of the component of initial ion velocity parallel to the front surface of the target to the component of initial ion velocity perpendicular to the front surface of the target. This dispersion is reduced by including in front of the target a wire grid 512 that is parallel to this front surface and that is biased to accelerate these ions away from the target, thereby reducing the ratio $V_1/V_2$ between the component $V_1$ of ion velocity parallel to this front surface and the component $V_2$ perpendicular to this front surface. The electrical field distribution produced by grid 512 is more constant in magnitude and direction than is produced without including this grounded grid adjacent to the front surface of the target, whereby a further reduction in dispersion is achieved.

Grid 512 is held at ground potential and the target is held at 15–28 kV to accelerate these ions substantially perpendicularly away from the target without producing unwanted electrical fields within the electron drift region. The grid is formed from wires that are as thin as possible without being so fragile as to break under normal use. In this embodiment, the grid exhibits a 96% transmission, is spaced 4 mm from the target and is 3 mm in diameter. The voltage difference between this grid and the target is less than 30 kV and preferably is 27 kV. The polarity of this voltage difference depends on whether positive or negative ions are to be detected.

A laser source 513 produces a laser beam 514 that is incident on target 51 at an angle α with respect to a normal N to the surface of target 51. Tests have shown that the efficiency of ion production is a decreasing function of this angle α. Therefore, it is preferred that this angle be as small as possible. When this is balanced by considerations of placing this laser source relative to the other components, it was found that an angle of 46° is optimal. This contrasts with existing time of flight mass spectrometers in which this angle is typically on the order of 60–70 degrees.

Appendix A: Parts List

| | | |
|---|---|---|
| Capacitor | C2 | 3.3 nF |
| Capacitor | C3 | 2 nF |
| Capacitor | C4 | 1 nF |
| Capacitor | C5 | 10 nF |

-continued

| Appendix A: Parts List | | |
|---|---|---|
| Diode | D1 | 1B4148 |
| Diode | D2 | 1N4148 |
| LED | J1 | BNC |
| LED | J2 | BNC |
| Opto Receiver | J6 | HFBR2524 |
| Resistor | R2 | 27 Ω |
| Resistor | R4 | 4.7 kΩ |
| Resistor | R5 | 4.7 kΩ |
| Resistor | R9 | 470 Ω |
| Resistor | R10 | 470 Ω |
| Resistor | R11 | 10 kΩ |
| Resistor | R12 | 270 kΩ |
| Resistor | R13 | 10 kΩ |
| Resistor | R14 | 10 kΩ |
| Resistor | R17 | 1 kΩ |
| Potentiometer | R19 | 50 kΩ |
| Potentiometer | R20 | 100 kΩ |
| Resistor | R29 | 2.2 kΩ |
| Resistor | R30 | 1 kΩ |
| NPN transistor | T1 | 2N3904 |
| IC | U1 | 74LS221 |
| IC | U2 | 74LS221 |

I claim:

1. A time of flight mass spectrometer comprising:

a target;

an energy source for directing pulses of energy onto said target to eject ions from said target;

a dynode detector, positioned to receive said ions and having a plurality of dynode plates placed to sequentially amplity a charge pulse produced in response to one of said ions;

a set of Q capacitors, each of which is connected to a uniquely associated one of a set of Q of said dynode plates that are at an output end of said dynode detector, whereby these Q capacitors each functions as a charge reservoir for providing a high current pulse to the dynode plate to which it is connected to enhance an amount of signal amplification needed by such dynode plates which require relatively large amounts of charge for optimal amplification of said charge pulse; and a timer that is responsive to emission of an ion from said target and that is responsive to reception of this ion by said dynode detector, to measure a time of flight of this ion from said target to said detector.

2. A time of flight mass spectrometer as in claim 1 wherein said Q capacitors are located outside of the vacuum chamber.

3. A time of flight mass spectrometer as in claim 1 wherein said Q capacitors are ceramic capacitors and are located within said dynode.

4. A time of flight mass spectrometer as in claim 1 wherein said Q capacitors are ceramic capacitors and are located a vacuum environment within a drift region of said mass spectrometer.

5. A time of flight mass spectrometer as in claim 1 further comprising a resistor ladder containing M resistors, wherein said dynode includes a set of P dynode plates and wherein M of said dynode plates, at an input end of said dynode detector, are each connected to an associated resistor in said resistor ladder.

6. A time of flight mass spectrometer as in claim 1 further comprising:

a microchannel plate between said target and said dynode, positioned to receive ions from said target and produce an amplified pulse of charge that is injected into said dynode.

7. A time of flight mass spectrometer comprising:

a target;

an energy source for directing pulses of energy onto said target to eject ions from said target;

an ion detector, positioned to receive said ions emitted from said target;

a timer that is responsive to emission of an ion from said target and that is responsive to reception of this ion by said ion detector, to measure a time of flight of this ion from said target to said detector; and a guide wire, oriented substantially perpendicular to a front surface of said target, from which ions are emitted, said guide wire being biased to a potential that attracts ions of a charge selected to be detected by said ion detector;

wherein the potential of said guide wire is selected such that substantially all of the ions emitted from said front surface of said target are imaged onto said ion detector.

8. A time of flight mass spectrometer as in claim 7 wherein:

because of the voltage on the guide wire, each of the ions ejected from the target executes a path having a lateral displacement from said guide wire that varies periodically as a function of the longitudinal displacement along the length of said guide wire, wherein all of these ejected ions have paths of substantially identical periods; and the voltage of the guide wire is selected such that each of the ejected ions travels along a path exhibiting substantially a single half period, whereby the voltage of the guide wire is the minimal voltage that will produce imaging of the ions onto the ion detector.

9. A time of flight mass spectrometer comprising:

a target:

an energy source for directing pulses of energy onto said target to eject ions from said target:

an ion detector positioned to receive said ions emitted from said target:

a timer that is responsive to emission of an ion from said target and that is responsive to reception of this ion by said ion detector, to measure a time of flight of this ion from said target to said detector; and a guide wire, oriented substantially perpendicular to a front surface of said target, from which ions are emitted, said guide wire being biased to a potential that attracts ions of a charge polarity selected to be detected by said ion detector:

wherein said energy pulse source is a laser that directs pulses of light onto said target in a direction that forms an angle of incidence, onto a front surface of the target, less than 50 degrees.

* * * * *